US 6,478,266 B1

(12) United States Patent
Tsau

(10) Patent No.: US 6,478,266 B1
(45) Date of Patent: Nov. 12, 2002

(54) COMPUTER KEYBOARD ASSEMBLY WITH EXCHANGEABLE WRIST SUPPORT

(75) Inventor: Yong-Der Tsau, Taipei (TW)

(73) Assignee: Behavior Tech Computer Corporation, Taipei (TW)

( * ) Notice: Subject to any disclaimer, the term of this patent is extended or adjusted under 35 U.S.C. 154(b) by 0 days.

(21) Appl. No.: 09/900,896

(22) Filed: Jul. 10, 2001

(51) Int. Cl.⁷ .................................................. B43L 15/00
(52) U.S. Cl. ................ 248/118.1; 248/118; 248/222.11; 400/715
(58) Field of Search .............................. 248/118, 118.1, 248/118.3, 918, 222.11, 222.12, 222.13; 400/472, 715

(56) References Cited

U.S. PATENT DOCUMENTS

| | | | | |
|---|---|---|---|---|
| 5,660,360 A | * | 8/1997 | Yang | 248/118 |
| 5,826,839 A | * | 10/1998 | Chen | 248/118 |
| 5,904,327 A | * | 5/1999 | Cheng | 248/118.1 |
| 6,029,940 A | * | 2/2000 | Klein | 248/222.12 |
| 6,179,254 B1 | * | 1/2001 | Min-Chen | 248/118.1 |
| 6,244,547 B1 | * | 6/2001 | Tonizzo et al. | 248/118.3 |
| 6,332,596 B1 | * | 12/2001 | Su | 248/118.1 |

* cited by examiner

*Primary Examiner*—Anita King
*Assistant Examiner*—Tan Le
(74) *Attorney, Agent, or Firm*—Rosenberg, Klein & Lee

(57) ABSTRACT

A computer keyboard assembly includes a keyboard and a wrist support which is releasably mounted to the keyboard by a retention device. The retention device includes a slide movably received in a slot defined in a front extension of the keyboard. The slide has an L-shaped top projection defining a channel. A guide plate is fixed to the front extension of the keyboard by a bolt and has an edge movably received in the channel for retaining the slide in the slot and guiding the movement of the slide. A pawl is formed on the slide to be movable therewith between a released position and a secured position. The slide is biased by a spring a toward the secured position where the pawl engages a U-shaped member formed on an underside of the wrist support thereby securing the wrist support to the keyboard. A notch is defined in a bottom face of the slide for manually moving the slide against the spring toward the released position where the pawl disengages from the U-shaped member of the wrist support for releasing the wrist support from the keyboard.

1 Claim, 5 Drawing Sheets

COMPUTER KEYBOARD ASSEMBLY WITH EXCHANGEABLE WRIST SUPPORT

FIELD OF THE INVENTION

The present invention generally relates to a computer keyboard, and in particular to a computer keyboard assembly having an exchangeable wrist support.

BACKGROUND OF THE INVENTION

A keyboard is a common input device for a computer. A user usually uses two hands to operate the keyboard. However, in operating a keyboard, a user must suspend his or her wrists. This causes extreme strains on the user's wrists in an excessive period of operating the keyboard. A wrist support is usually attached to a front side of the keyboard for supporting the wrists of the user.

Some conventional wrist supports are integrally fixed with a keyboard. Adding a wrist support to a keyboard increases the overall size of the keyboard and consequently, costs of package and transportation of the keyboard are increased. Furthermore, such an integral structure of the wrist support and the keyboard does not allow a user to change the wrist support. This may cause problems when a computer is to be used by many users, including adults and children, for the length of the arms is different between an adult and a child.

Wrist supports having a foldable structure are also available in the market. Such foldable wrist supports can overcome the size problem, but is still not suitable for different users due to its incapability to exchange with or replace with other wrist supports.

It is thus desirable to provide a keyboard having exchangeable wrist support to overcome the above-discussed problems.

SUMMARY OF THE INVENTION

Accordingly, an object of the present invention is to provide a keyboard assembly having a wrist support that can be released from the keyboard for exchange with a different wrist support.

Another object of the present invention is to provide a device for releasably mounting a wrist support to a keyboard for allowing ready removal of the wrist support in order to reduce the overall size of the keyboard assembly.

To achieve the above objects, in accordance with the present invention, there is provided a keyboard assembly comprising a keyboard and a wrist support which is releasably mounted to the keyboard by a retention device. The retention device comprises a slide movably received in a slot defined in a front extension of the keyboard. The slide has an L-shaped top projection defining a channel. A guide plate is fixed to the front extension of the keyboard by a bolt and has an edge movably received in the channel for retaining the slide in the slot and guiding the movement of the slide. A pawl is formed on the slide to be movable therewith between a released position and a secured position. The slide is biased by a spring toward the secured position where the pawl engages a U-shaped member formed on an underside of the wrist support thereby securing the wrist support to the keyboard. A notch is defined in a bottom face of the slide for manually moving the slide against the spring toward the released position where the pawl disengages from the U-shaped member of the wrist support for releasing the wrist support from the keyboard.

DESCRIPTION OF THE DRAWINGS

The present invention will be apparent to those skilled in the art by reading the following description of a preferred embodiment thereof, with reference to the attached drawings, in which.

DETAILED DESCRIPTION OF THE PREFERRED EMBODIMENT

Figure 1:
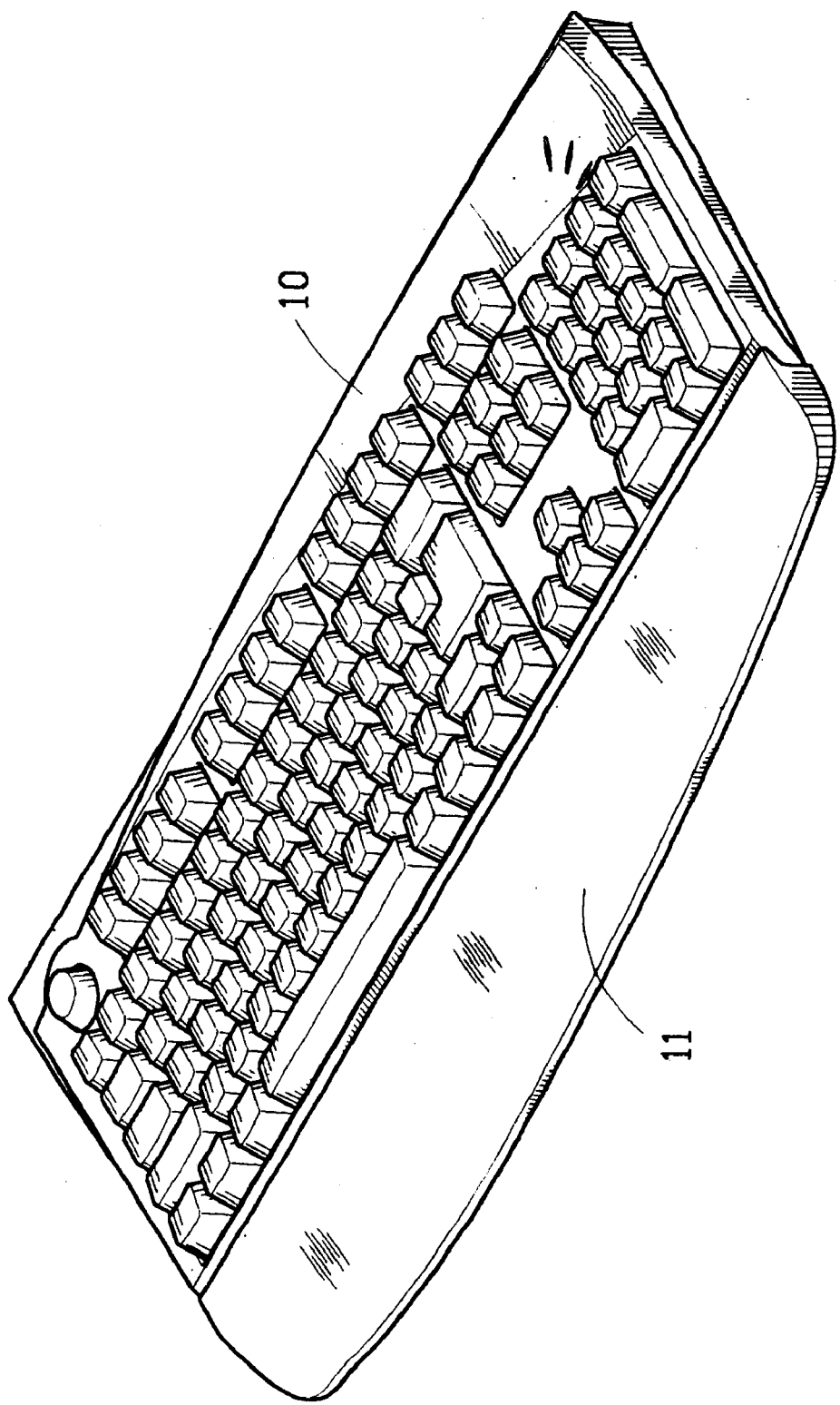
FIG. 1 is a perspective view showing a keyboard assembly with changeable wrist support constructed in accordance with the present invention.
Figure 2:
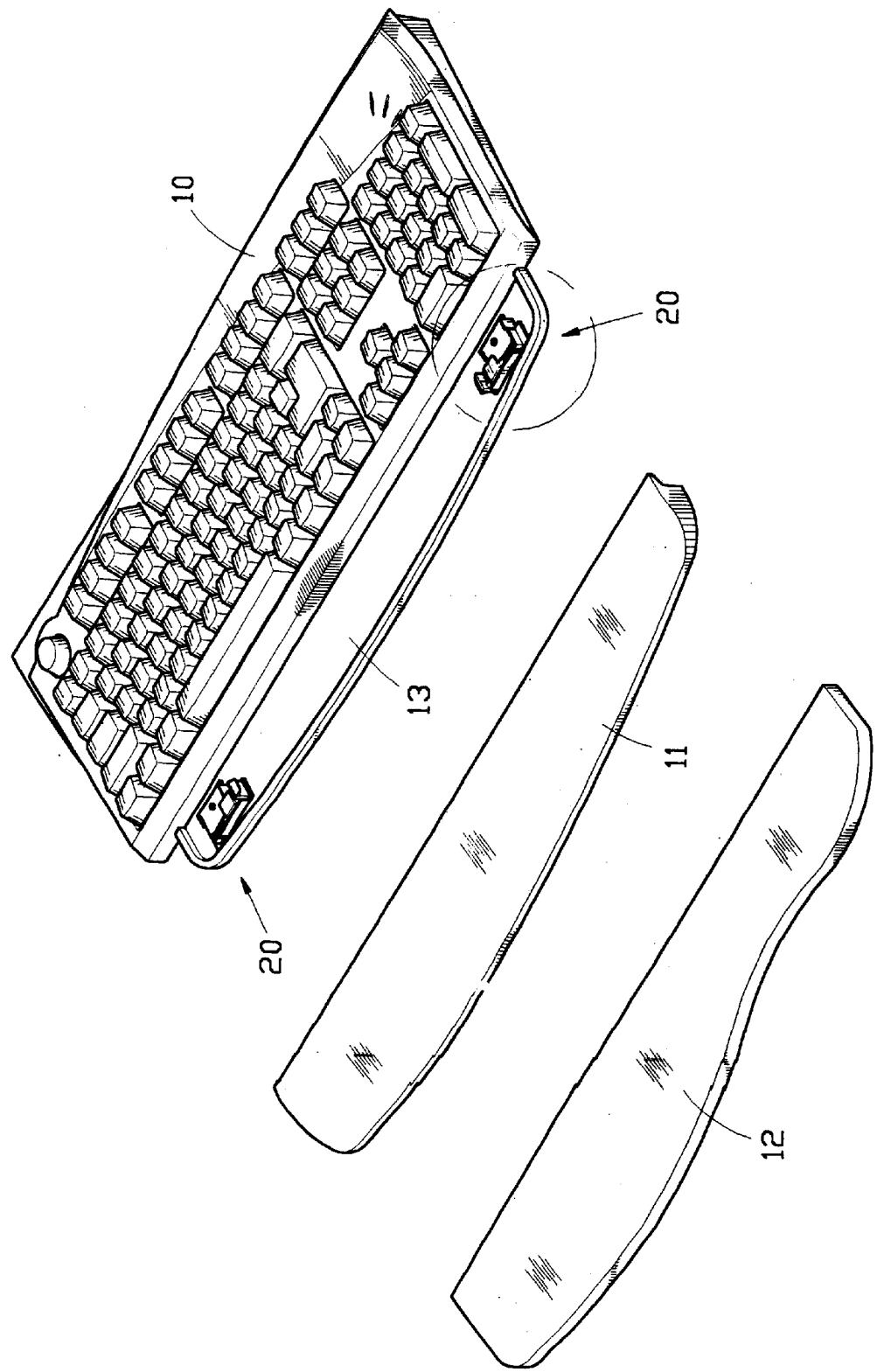
FIG. 2 is an exploded view of FIG. 1 with the wrist support detached from the keyboard assembly.

With reference to the drawings and in particular to FIGS. 1 and 2, a keyboard assembly in accordance with the present invention a keyboard 10 to which a wrist support 11 attached to the keyboard 10 for supporting the wrists of a computer user (not shown). In accordance with the present invention, releasable mounting means (not labeled) is provided for releasably mounting the wrist support 11 to the keyboard 10 whereby the computer user may replace or change the wrist support 11 with a new or different wrist support 12 (FIG. 2).

Figure 3:
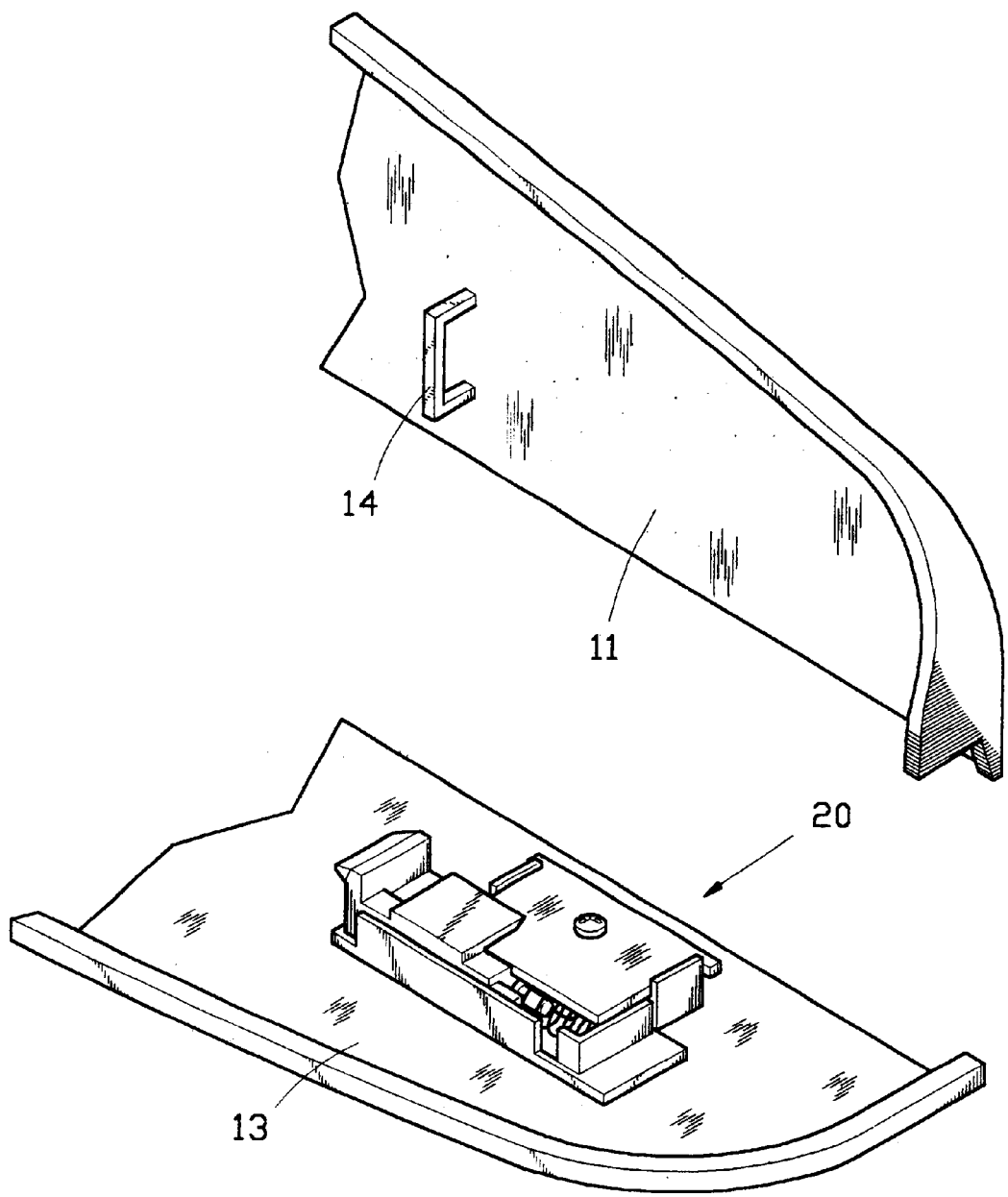
FIG. 3 is an enlarged view of the encircled portion of FIG. 2.
Figure 4:
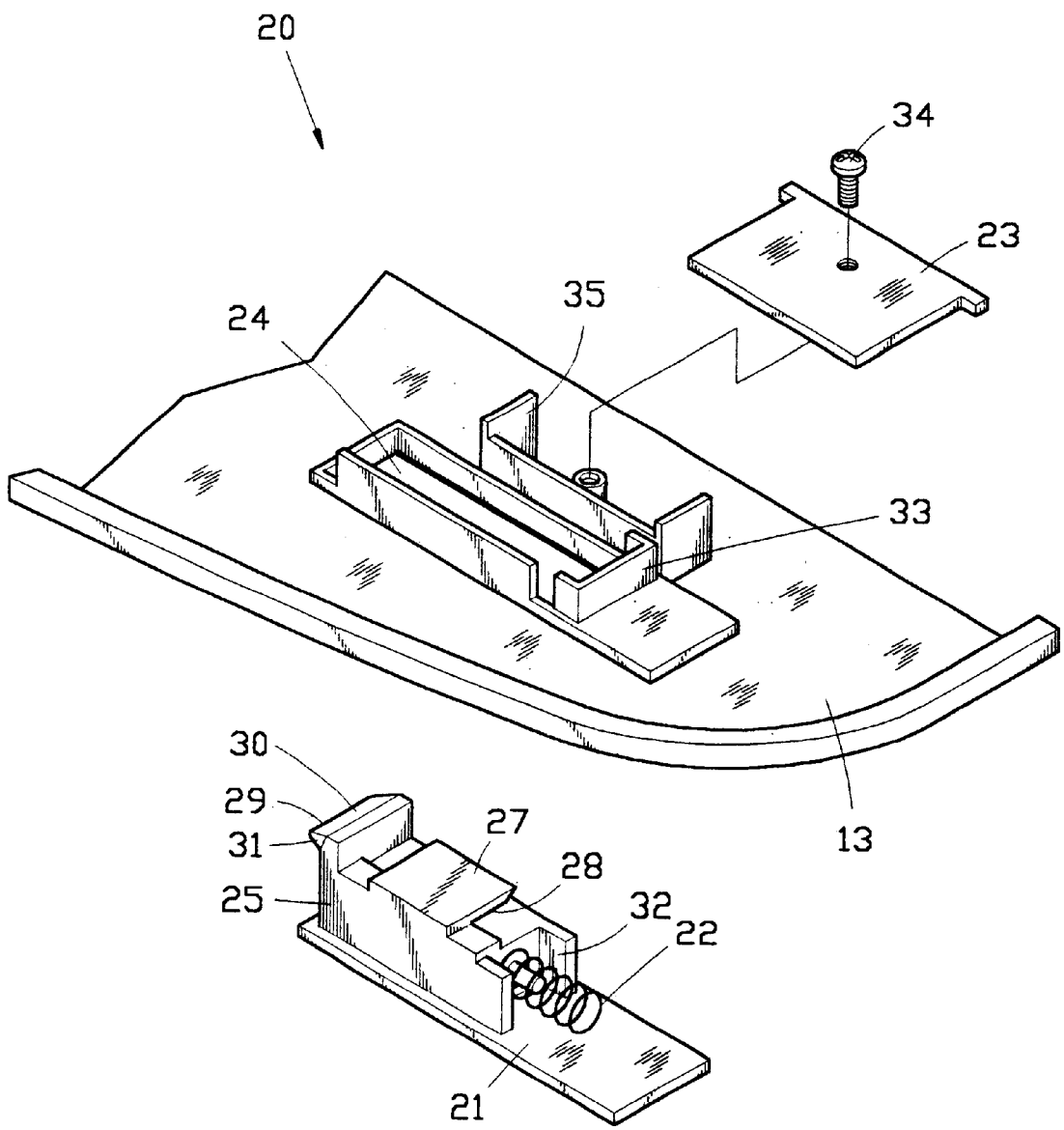
FIG. 4 is an exploded view of FIG. 3.

Referring to FIGS. 2–4, a front extension 13 is formed on a front side of the keyboard 10. The front extension 13 may be integrally formed with the keyboard 10 or alternatively it may be secured to the keyboard 10 by any known means, such as bolts. The releasable mounting means of the present invention comprises at least one, preferably two as shown in FIG. 2, retention devices 20. Each retention devices 20 releasably engages a corresponding U-shaped member 14 formed on an underside of the wrist support 11 for securing the wrist support 11 to the keyboard 10. The U-shaped member 14 defines an opening (not labeled) with which a moveable pawl 29 of the corresponding retaining device 20 engages, as shown in FIG. 5, thereby securely retaining the wrist support 11 to the keyboard 10.

Figure 5:
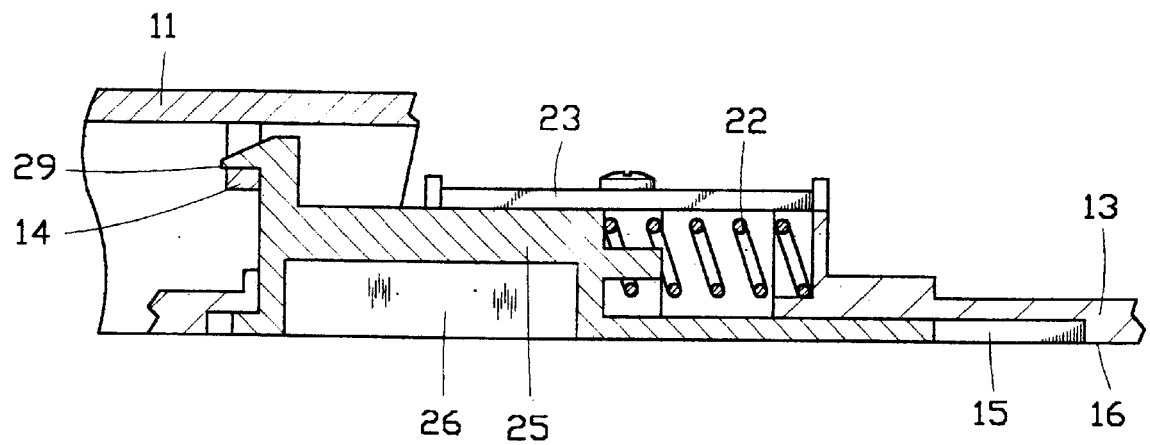
FIG. 5 is a cross-sectional view of a releasable wrist support mounting device of the keyboard in accordance with the present invention, showing the mounting device at a secured position.
Figure 6:
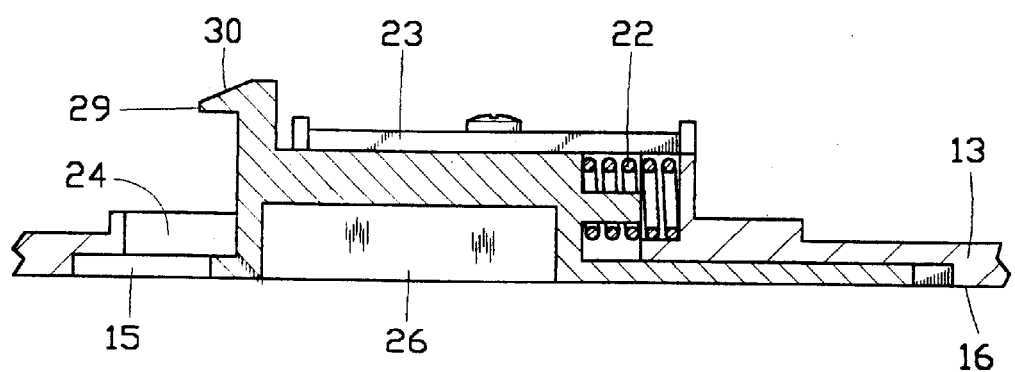
FIG. 6 is similar to FIG. 5 but showing the mounting device at a released position.

Also referring to FIGS. 5 and 6, a recess 15 is defined in a bottom face 16 of the front extension 13 for movably receiving and retaining each retention device 20. An elongate opening or slot 24 is defined in the front extension 13 in the recess 15 through which the retention device 20 extends. The retention device 20 comprises a base plate 21 received and retained in the recess 15 of the front extension 13 and a slide block 25 extending from the base plate 21 and received in the slot 24. The base plate 12 and the slide block 25 are movable within the recess 15 and the slot 24 between a released position (FIG. 6) and a secured position (FIG. 5). A bottom cavity or notch 26 is defined in a bottom face (not labeled) of the base plate 12 for manually driving the slide block 25 from the secured position to the released position. The slide block 25 has a top surface (not labeled) on which an inverted L-shaped projection 27 is formed. The projection 27 has a segment spaced from and substantially parallel to the top surface of the slide block 25 for defining a channel 28 therebetween.

A guide plate 23 is secured to the front extension 13 with an edge portion (not labeled) thereof movably received in the channel 28 of the slide block 25 for guiding the movement of the slide block 25. Preferably, a chamber 35 is formed on the front extension 13 comprising two opposite walls (not labeled) for receiving and retaining the guide plate 23 therein. A bolt 34 is received in a hole (not labeled) defined in the guide plate 23 and threadingly engages an inner-threaded hole (not labeled) defined in the front extension 13 for securing the guide plate 23 to the front extension 13. The slide block 25, being engaged by the guide plate 23, is retained in the slot 24 of the front extension 13.

The pawl 29,is formed on the top surface of the slide block 25 at a front end of the block 25 and facing the corresponding U-shaped member 14 of the wrist support 11 or 12. The pawl 29 forms a first inclination 30 on a top side thereof and a second inclination 31 on at least one of opposite lateral sides thereof The inclinations 30, 31 serve as camming surfaces helping to guide the pawl 29 into engagement with the U-shaped member 14.

The retention device 20 also comprises means for biasing the pawl 29 toward the secured position. In the embodiment illustrated, the biasing means comprises a helical spring 22 accommodated in a cavity 32 defined in a rear end of the slide block 25. The spring 22 is retained in the cavity 32 by the guide plate 23. A first end of the spring 22 is supported by an end wall 33 of the slot 24 and a second end of the spring 22 is fit over and thus retained by a projection (not labeled) extending from the rear end of the slide block 25.

To mount the wrist support 11 to the keyboard 10, the wrist support 11 is placed on the front extension 13 of the keyboard 10. The U-shaped members 14 on the underside of the wrist support 10 contacts the pawls 29. The camming action caused by the first inclinations 30 of the pawls 29 helps driving the U-shaped members 14 into engagement with the pawls 29. The biasing force of the springs 22 forces the pawls 29 to securely retain the U-shaped members 14 thereby mounting the wrist support 11 to the keyboard 10 as shown in FIG. 5.

To remove the wrist support 11 from the keyboard 10, the pawls 29 are moved toward the released position as shown in FIG. 6 by user's manually moving the slide blocks 25 with the aid of notches 26 of the slide blocks 25. The U-shaped members 14 are disengaged from the pawls 29 and the wrist support 11 is free to remove from the keyboard 10. A new wrist support 12 (FIG. 2) may then be mounted to the keyboard 10 to replace the old wrist support 11.

Although the present invention has been described with reference to the preferred embodiment thereof, it is apparent to those skilled in the art that a variety of modifications and changes may be made without departing from the scope of the present invention which is intended to be defined by the appended claims.

What is claimed is:

1. A keyboard assembly comprising:

a keyboard having a front extension, a slot being defined in the front extension;

a retention device received and retained in the slot, the retention device comprising a pawl movable along the slot between a released position and a secured position and a biasing element driving the pawl toward the secured position, the retention device including a slide block having a front end and a rear end, the slide block having a channel formed therein, the biasing element being formed by a helical spring having a first end supported by an end wall formed on the front extension and a second end retained by a projection formed on the rear end rear end of the slide block;

a wrist support having an underside forming a U-shaped member, the pawl being biased by the biasing element to engage the U-shaped member for mounting the wrist support to the keyboard, the pawl being formed on the front end of the slide block and facing the U-shaped member; and a guide plate fixed to the front extension of the keyboard and movably received in the channel of the slide block for guiding movement of the slide block, the slide block having a cavity formed in the rear end thereof for accommodating the biasing element, the guide plate being extended over the cavity for retaining the biasing element in the cavity.

* * * * *